(12) United States Patent
Tachwali et al.

(10) Patent No.: US 12,541,028 B2
(45) Date of Patent: Feb. 3, 2026

(54) SYSTEMS AND METHODS FOR CLOCK-SKEW SEARCH TO IMPROVE DEPTH ACCURACY IN GEIGER MODE LIDAR

(71) Applicant: LG INNOTEK CO., LTD., Seoul (KR)

(72) Inventors: Yahia Tachwali, Princeton, NJ (US); Michael Schoenberg, Seattle, WA (US)

(73) Assignee: LG INNOTEK CO., LTD., Seoul (KR)

( * ) Notice: Subject to any disclaimer, the term of this patent is extended or adjusted under 35 U.S.C. 154(b) by 827 days.

(21) Appl. No.: 17/823,541

(22) Filed: Aug. 31, 2022

(65) Prior Publication Data

US 2024/0069205 A1 Feb. 29, 2024

(51) Int. Cl.
*G01S 17/00* (2020.01)
*G01S 7/4863* (2020.01)
*G01S 7/4865* (2020.01)
*G01S 17/10* (2020.01)
*G01S 17/89* (2020.01)
*G01S 17/931* (2020.01)

(52) U.S. Cl.
CPC .......... *G01S 17/931* (2020.01); *G01S 7/4863* (2013.01); *G01S 7/4865* (2013.01); *G01S 17/10* (2013.01); *G01S 17/89* (2013.01)

(58) Field of Classification Search
CPC ............... G01S 17/931; G01S 17/4863; G01S 17/4865; G01S 17/10; G01S 17/89
See application file for complete search history.

(56) References Cited

U.S. PATENT DOCUMENTS

| 9,354,332 | B2 * | 5/2016 | Zwaans | G01T 1/2985 |
| 11,830,194 | B2 * | 11/2023 | Phelps | G01S 17/89 |
| 2018/0100929 | A1 * | 4/2018 | O'Keeffe | G01S 17/931 |

(Continued)

FOREIGN PATENT DOCUMENTS

EP 3370080 A1 * 9/2018 ........... G01S 7/4865

OTHER PUBLICATIONS

Ullrich, A. et al., Linear LIDAR versus Geiger-mode LIDAR: Impact on data properties and data quality, Laser Radar Technology and Applications XXI, edited by Monte D. Turner, Gary W. Kamerman, Proc. of SPIE vol. 9832, 983204, 2016.

*Primary Examiner* — Gerald J Sufleta, II
(74) *Attorney, Agent, or Firm* — Birch, Stewart, Kolasch & Birch, LLP

(57) ABSTRACT

Disclosed herein are systems, methods, and computer program products to improve the accuracy of range measurements of a lidar system. The methods comprise: obtaining, by a processor, results produced by photodetectors of the lidar system in response to light pulses arriving at the photodetectors over time; introducing a clock drift into a clock of the lidar system, the clock drift being modeled by an analytical function; assigning, by the processor, the results to bins based on associated times at which the light pulses arrived at the photodetectors as specified by the clock; building, by the processor, a histogram using the results which have been assigned to the bins; performing, by the processor, fitting operations to fit the histogram to the analytical function a derived function of the analytical function; and identifying, by the processor, a peak of the histogram based on results of the fitting operations.

20 Claims, 11 Drawing Sheets

(56) References Cited

U.S. PATENT DOCUMENTS

| | | | |
|---|---|---|---|
| 2021/0124027 A1* | 4/2021 | Holzhüter | G01S 17/931 |
| 2021/0181317 A1* | 6/2021 | Zhu | G01S 17/10 |
| 2022/0057519 A1* | 2/2022 | Goldstein | G01S 17/88 |
| 2022/0390903 A1* | 12/2022 | Myers | H03L 7/0818 |
| 2024/0393746 A1* | 11/2024 | Strassmann | G04F 10/005 |
| 2025/0094519 A1* | 3/2025 | Kol | H04L 67/59 |

* cited by examiner

SYSTEMS AND METHODS FOR CLOCK-SKEW SEARCH TO IMPROVE DEPTH ACCURACY IN GEIGER MODE LIDAR

BACKGROUND

Light detecting and ranging (lidar) systems are used in various applications. One application for lidar systems is autonomous vehicles (AVs). AVs may use lidar systems to measure the distance from the AV to surrounding objects. To accomplish this task, the lidar system illuminates an object with light and measures the reflected light with a sensor. The reflected light is used to determine features of the object that reflected it and to determine the distance the object is from the AV. Lidar systems also may be used in other applications, such as in aircraft, ships and/or mapping systems.

SUMMARY

The present disclosure concerns implementing systems and methods for operating a lidar system. The methods comprise: obtaining, by a processor, results produced by photodetectors of the lidar system in response to light pulses arriving at the photodetectors over time; introducing a clock drift into a clock of the lidar system, the clock drift being modeled by an analytical function; assigning, by the processor, the results to bins based on associated times at which the light pulses arrived at the photodetectors as specified by the clock; building, by the processor, a histogram using the results which have been assigned to the bins; performing, by the processor, fitting, curve fitting and/or interpolation operations to fit the histogram to the analytical function or a derived function of the analytical function (such as an inverse or derivative of the analytical function if such exists); and identifying, by the processor, a peak of the histogram based on results of the fitting, curve fitting and/or interpolation operations.

The implementing systems can comprise: a processor; and a non-transitory computer-readable storage medium comprising programming instructions that are configured to cause the processor to implement a method for operating a lidar system. The above-described methods can also be implemented by a computer program product comprising memory and programming instructions that are configured to cause a processor to perform operations.

BRIEF DESCRIPTION OF THE DRAWINGS

The accompanying drawings are incorporated herein and form a part of the specification.

In the drawings, like reference numbers generally indicate identical or similar elements. Additionally, generally, the leftmost digit(s) of a reference number identifies the drawing in which the reference number first appears.

DETAILED DESCRIPTION

Figure 1:
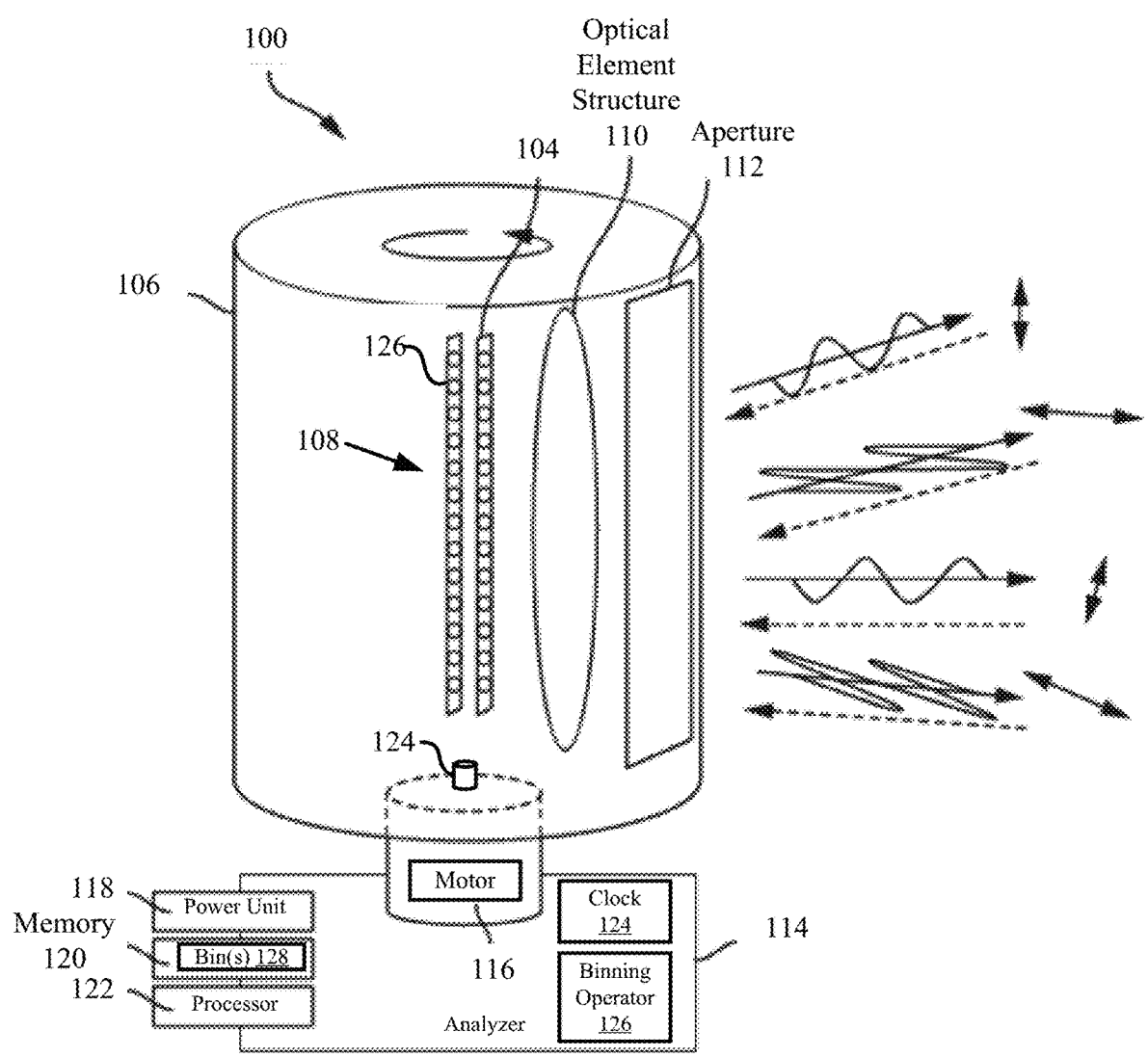
FIG. 1 provides an illustration of a lidar system.

In a Geiger mode lidar system, the sensor comprises an avalanche detector (or photodiode) configured to produce an electrical pulse of a given amplitude in response to an absorption of a photon of the same or similar wavelength as the light signal which was emitted. A histogram is then assembled over many trials, and the location of an object's surface is estimated from the peak of the histogram. The term "trial" as used here refers to each measurement attempt. A measurement attempt comprises sending a pulse and recording the detection time. The trial is associated with the measurement, but not necessarily the pulse. There can be multiple trials from a single pulse by grouping the detections from multiple detectors. Each detector output is a measurement. However, the accuracy of the histogram is fundamentally limited by the width of a bin. Binning is required due to technological limitations on the clock accuracy. The binning is performed to group individual results into classes or categories. Even though the bins may be quite small in human terms (for example, under a nanosecond), the bins still limit accuracy of the result. Light travels fifteen centimeters in five hundred picoseconds. In 500 picoseconds, the roundtrip distance would be 15 centimeters. So, the distance measured in one way is 7.5 centimeters. Since the time resolution is set at 500 picosecond, the distance measurement is set at 7.5 centimeter increments. If the pulse arrival time is rounded to the closest 500 nanosecond increment, then the maximum range error is half of 7.5 centimeters which is 3.75 centimeters. In order to overcome this limitation, the present solution intentionally introduces drift into the clock that determines to which bin a trial accrues.

The present solution provides a technique to operate a lidar system with relatively higher accuracy in distance measurements. The method comprises: obtaining, by a processor, results produced by photodetectors of the lidar system in response to light pulses arriving at the photodetectors over time; introducing a clock drift into a clock of the lidar system (e.g., transmitter or receiver), the clock drift being modeled by an analytical function; assigning, by the processor, the results to a plurality of bins based on associated times at which the light pulses arrived at the photodetectors as specified by the clock or based on distances corresponding to the associated times at which pulses arrived at the photodetectors; building, by the processor, a histogram using the results which have been assigned to the plurality of bins; performing, by the processor, fitting, curve fitting and/or interpolation operations to fit the histogram to the analytical function a derived function of the analytical function (such as an inverse or derivative of the analytical function if such exists); identifying, by the processor, a peak of the histogram based on results of the fitting, curve fitting and/or interpolation operations; and/or adjusting the peak based on an average time delay introduced into the clock by the analytical function. The processor may use the inferred range information from the adjusted peak to control the operations of an autonomous vehicle.

The present solution improves the accuracy of range measurement. Range is estimated by measuring round trip time. The round trip time is elapsed time between light emission and avalanche time at the detector. The accuracy is improved by modulating the round trip time by an analytical function.

FIG. 1 illustrates an architecture for a lidar system 100, in accordance with aspects of the disclosure. Lidar system 100 is merely an example lidar system and that other lidar systems are further contemplated in accordance with aspects of the present disclosure, as should be understood by those of ordinary skill in the art.

As shown in FIG. 1, the lidar system 100 includes a housing 106 which may be rotatable 360° about a central axis such as hub or axle 124 of a motor 116. The housing 106 may include an emitter/receiver aperture 112 made of a material transparent to light. Although a single aperture is shown in FIG. 1, the present solution is not limited in this regard. In other scenarios, multiple apertures for emitting and/or receiving light may be provided. Either way, the lidar system 100 can emit light through the aperture(s) 112 and receive reflected light back toward the aperture(s) 112 as the housing 106 rotates around the internal components. In alternative scenarios, the outer shell of housing 106 may be a stationary dome, at least partially made of a material that is transparent to light, with rotatable components inside of the housing 106.

Inside the rotating shell or stationary dome is a light emitter system 104 that is configured and positioned to generate and emit pulses of light through the aperture 112 or through the transparent dome of the housing 106 via one or more laser emitter chips or other light emitting devices. The emitter system 104 may include any number of individual emitters (for example, 8 emitters, 64 emitters, or 128 emitters). The emitters may emit light of substantially the same intensity or of varying intensities. The lidar system 100 also includes a light detector 108 containing an array of photodetectors 126. The photodetectors 126 can include, but are not limited to, avalanche photodiodes. The photodetectors 126 are positioned and configured to receive light reflected back into the system. The light emitter system 104 and light detector 108 rotate with the rotating shell, or they rotate inside the stationary dome of the housing 106. One or more optical element structures 110 may be positioned in front of the light emitting system 104 and/or the light detector 108 to serve as one or more lenses or wave plates that focus and direct light that is passed through the optical element structure 110.

One or more optical element structures 110 may be positioned in front of a mirror (not shown) to focus and direct light that is passed through the optical element structure. As shown in FIG. 1, a single optical element structure 310 is positioned in front of the mirror and connected to the rotating elements of the system so that the optical element structure 110 rotates with the mirror. Alternatively or additionally, the optical element structure 110 may include multiple such structures (for example, lenses and/or waveplates). Optionally, multiple optical element structures 110 may be arranged in an array on or integral with the shell portion of the housing 106.

The lidar system 100 includes a power unit 118 to power the light emitting system 104, motor 116, and electronic components. The lidar system 100 also includes an analyzer 114 with elements such as a processor 122 and non-transitory computer-readable memory 120 containing programming instructions. The programming instructions are configured to enable the system to receive data collected by the light detector 108, analyze the received data to measure characteristics of the light received, and generate information that a connected system can use to make decisions about operating in an environment from which the data was collected. Optionally, the analyzer 114 may be integral with the lidar system 100 as shown, or some or all of it may be external to the lidar system and communicatively connected to the lidar system via a wired or wireless communication network or link.

Figure 2:
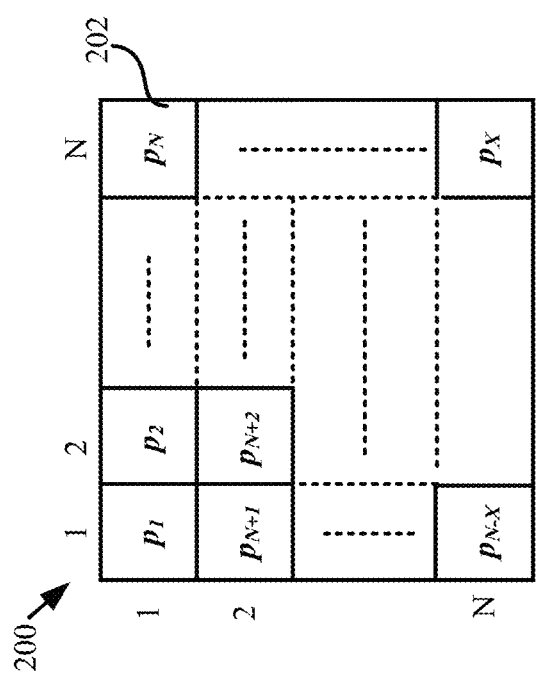
FIG. 2 provides an illustration showing results from photodetectors of the lidar system shown in FIG. 1.

The lidar system 100 also includes a clock 124 and a binning operator 126. The binning operator 126 is configured to group or otherwise assign results produced by the photodetectors 126 to bin(s) 128. The photodetectors 126 may be arranged in a grid pattern to form an array. As shown in FIG. 2, results $p_1, p_2, \ldots, p_X$ from the photodetectors 126 may be represented in grid 200 defined by a plurality of cells, where each cell 202 is associated with a respective one of the photodetectors and x is an integer equal to the total number of photodetectors in the array. The cells of the grid 200 can be arranged in the same pattern as the photodetectors, for example, a 256×256 cell grid pattern. Each result is also referred to herein as a pixel of a lidar image.

Figure 3:
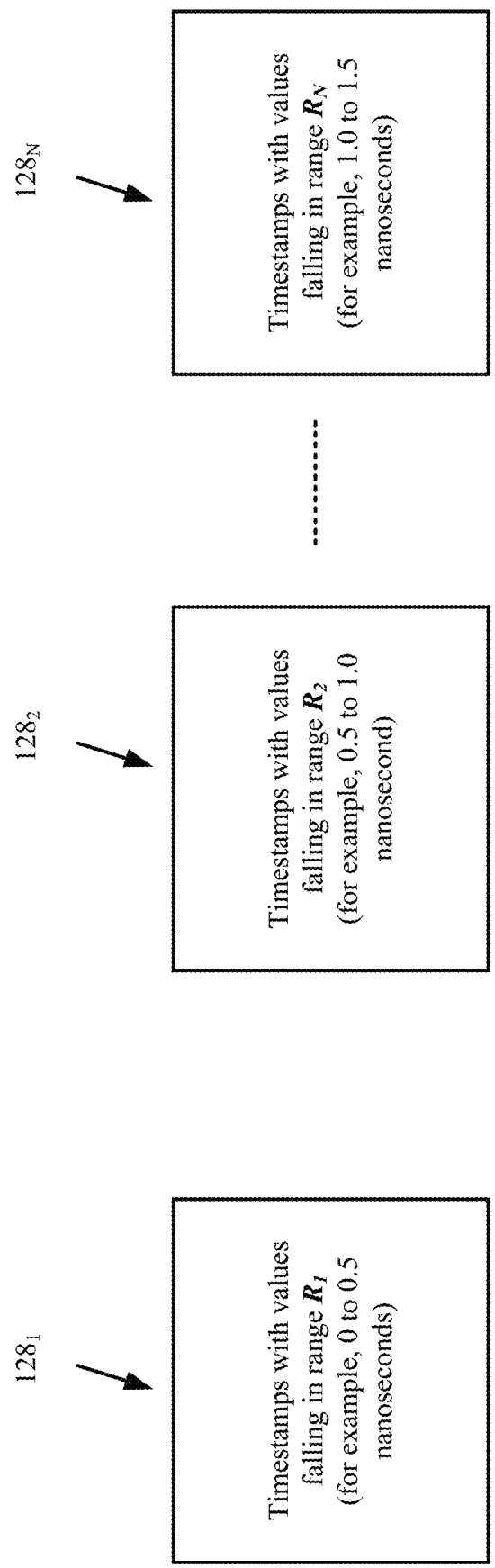
FIG. 3 provides an illustration showing bins to which results from photodetectors of the lidar system shown in FIG. 1 are assigned or otherwise assigned.

The detections from a lidar system are binned into histogram(s) in which its bins represent time intervals. The detections, as used here, refer to the timestamps associated with each pixel of a plurality of pixels $p_1, p_2, \ldots, p_X$ or each superpixel of a plurality of superpixels. For example, as shown in FIG. 3, the timestamps associated with the pixel or superpixels are assigned to bins $128_1, 128_2, \ldots, 128_N$ based on pre-defined time ranges $R_1, R_2, \ldots, R_N$. The time ranges $R_1, R_2, \ldots, R_N$ define the time intervals at which timestamps are binned. Timestamps falling between value $v_1$ (for example, 0.0 nanoseconds) and value $v_2$ (for example, 0.5 nanoseconds) are assigned to bin $128_1$. Timestamps falling between value $v_2$ (for example, 0.5 nanoseconds) and $v_3$ (for example, 1.0 nanoseconds) are assigned to bin $128_2$. Timestamps falling between value $v_3$ (for example, 1.0 nanoseconds) and $v_4$ (for example, 1.5 nanoseconds) are assigned to bin $128_N$. The present solution is not limited by the particulars of this example.

Figure 4:
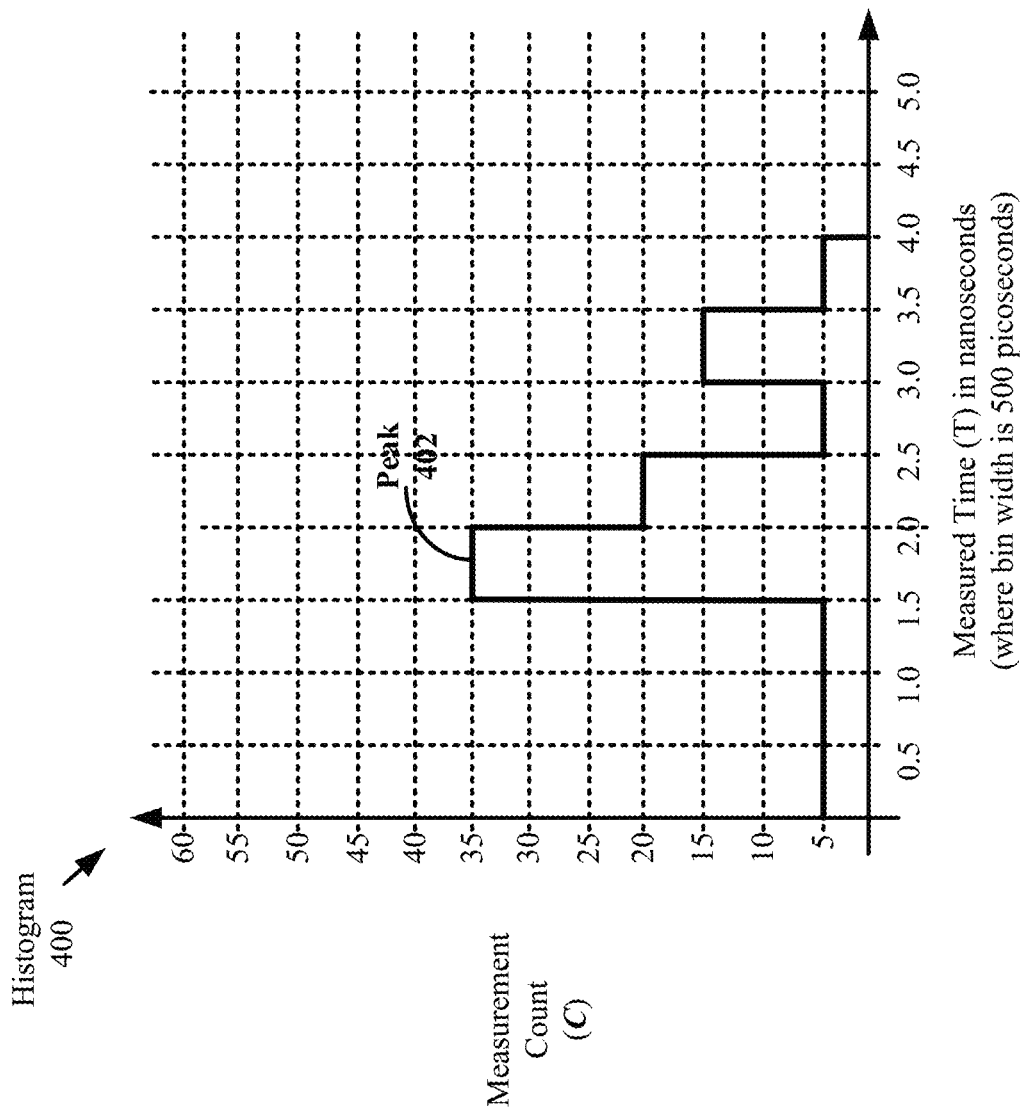
FIG. 4 shows an illustrative histogram.

The bin(s) 128 is(are) stored in memory 120 and used to generate histogram(s) from which location(s) of object surface(s) is(are) estimated. An illustrative histogram 400 is shown in FIG. 4. A location of an object's surface is estimated from a peak 402 of the histogram 400.

The histogram 400 plots measurement count C verse measured time T in nanoseconds. The measurement count refers to the total number of pixels having an associated pulse arrival time falling within a given time period (or sub-time period) over a plurality of trials. The measured time represents an arrival time of a pulse at a photodetector of the lidar system. The present solution is not limited to the particulars of FIG. 4.

As noted above, the accuracy of the histogram(s) is(are) fundamentally limited by the bin width bin_width. In order to overcome this accuracy issue, the present solution involves introducing drift into the clock 124 that determines in which bin each pixel is assigned. An illustrative histogram 500 is provided in FIG. 5 which shows how the histogram of FIG. 4 is stretched when the clock drift has been added to the system.

The function h(a,b) allows reasoning about how returns of the lidar map to bins in the present system. h(a,b) is an abstraction and may be modified in the following discussion in accordance with examples. For example, the following mathematical equation (1) shows the function with an identity drift function. The drift function will later be described with $f(a,b)$. a represents a time when light is emitted from the lidar system. b represents a time when the photodiode avalanches. b-a is the Time of Flight (ToF) of the light signal, i.e., the time it takes for light to be emitted, hit an object, and return to the lidar system. Note that here, a and b are real valued numbers and not physically measurable. h(a,b) is an abstraction to allow reasoning about how the binned clock system works. An example of such a function h, that does not induce drift by captures the binning behavior standard in such sensors, is $$h(a,b)=\text{floor}((b-a)/\text{bin\_width})+0.5 \quad (1)$$

The 0.5 bin addition is to compensate for the 0.5 bin average bias introduced by the floor operation. The floor operation returns the largest integer less than or equal to a real number x. x is defined in mathematical equation (1) as (b - a)/bin_width.

Given a flat wall at a fixed distance, any peak finding algorithm can at best resolve the center of the bin as the location of the surface—because all returns fall into the same bin. It is desirable to instead cause some of the returns to fall into neighboring bins in a manner that provides more information about surfaces of objects. Suppose that a structured clock drift is introduced that is described by the function $f(a,b)$ to bias time measurements. This can be achieved without explicitly measuring either of a or b by adding an electrical component where the photon is received that produces (for example) periodicity or noise of known character. Alternatively, this could be centralized physically by adding delay logic to the measurement of the photon emission. Mathematical equation (1) can be rewritten as follows or in some instantiations, floor($f(a, b)$)/bin_width)+0.5 to introduce the clock drift to bias time measurements.

$$h(a,b)=\text{floor}(f(a,b)/\text{bin\_width})+0.5 \quad (2)$$

As long as the change introduced by $f(a, b)$ varies by at least bin_width,, some returns will be assigned incorrectly to nearby histogram bins. That is, h(a,b) represents a real signal that is convolved with the analytic function $f$ which was introduced to cause clock error. Simply put, the present solution involves the following operations: (i) applying via physical or electronic mechanism a known source of clock drift modeled by a known analytical function $f$; (ii) obtaining measurements into a quantized histogram such that each measurement is affected by the known analytical function $f$ before quantization; and (iii) recovering the peak of the histogram below the granularity of a bin by fitting the spread of the data to the known analytical function $f$ or otherwise incorporating the known analytical function $f$ or the inverse of the known analytical function $f^1$ into the peak recovery logic.

The analytical function $f$ describes: a relationship between a time that light is emitted from a lidar system and an avalanche time of a photodetector of the lidar system; and/or spreads results of the lidar system across multiple bins in a known manner using parameter(s) that allow a histogram to be fit to the function via a fitting, curve fitting and/or interpolation process. The parameter(s) can include, but is(are) not limited to, the time that light is emitted from the lidar system and the avalanche time of the photodetector of the lidar system. The fitting, curve fitting and/or interpolation process can include, but is not limited to, a linear interpolation (for example, when $f$ is a ramp function) and/or a parabolic interpolation (for example, when $f$ is a sign wave function).

Figure 5:
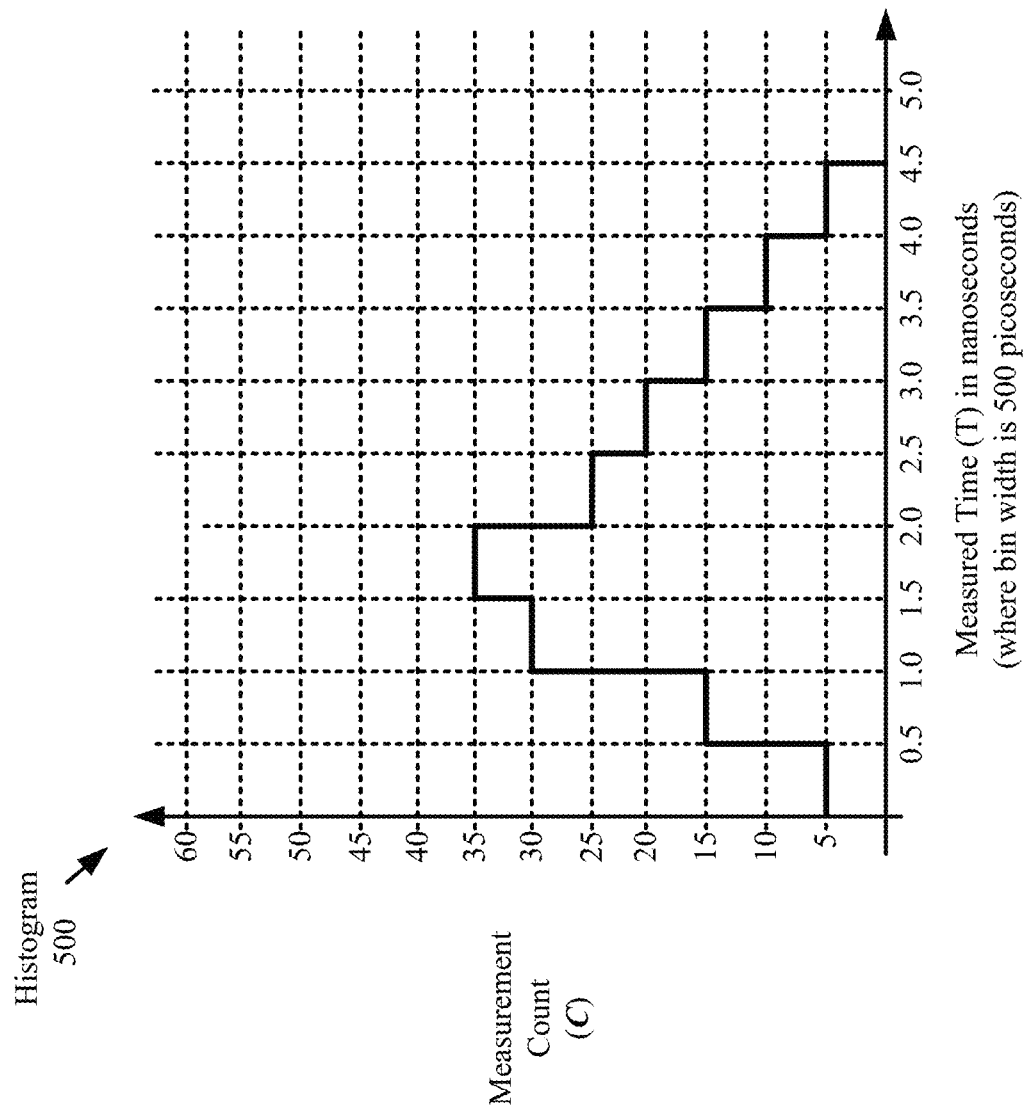
FIG. 5 shows another illustrative histogram results for adding drift to a clock used for binning results of photodetectors.
Figure 6:
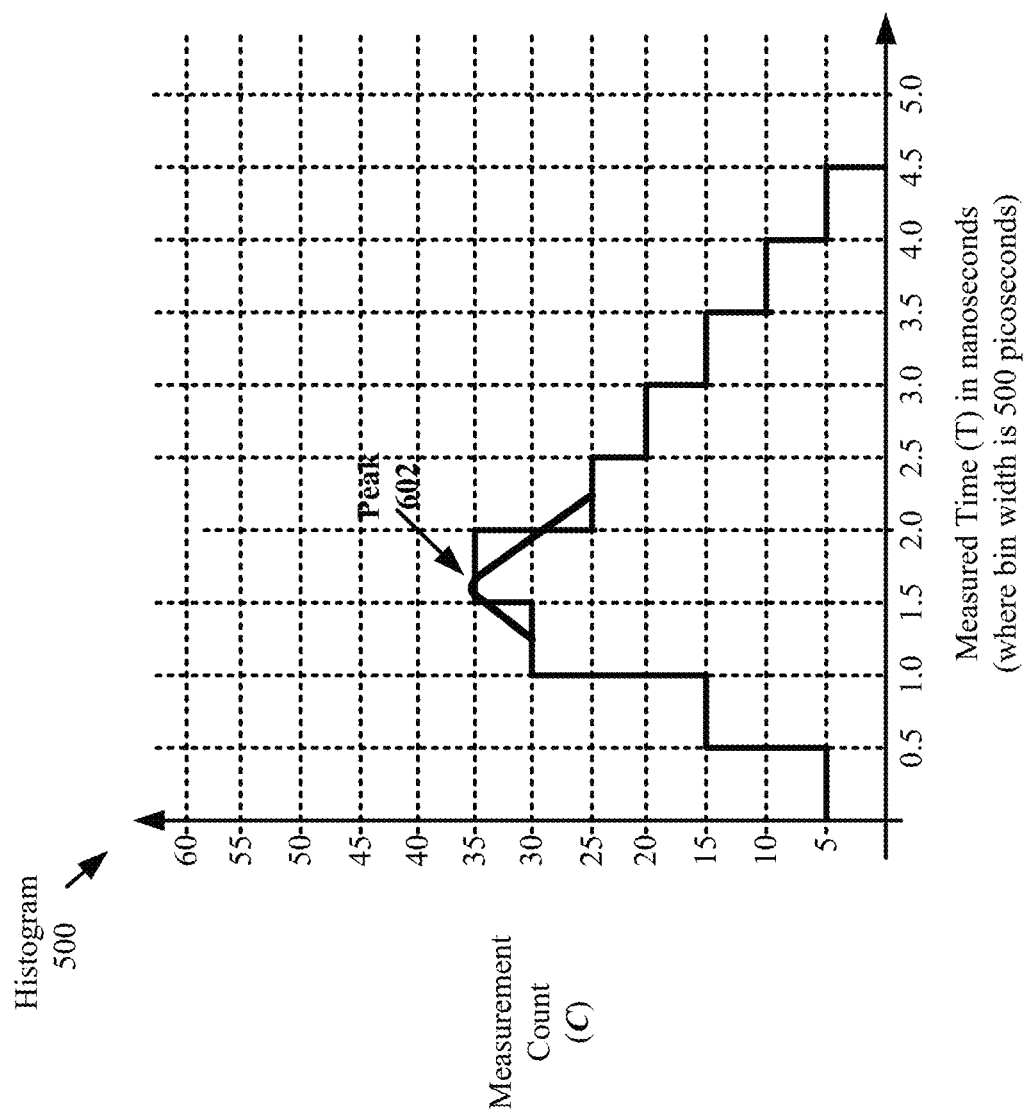
FIG. 6 provides an illustration showing a function $f$ being fit to the histogram of FIG. 5 for recovering a peak.

A histogram 500 resulting from the above-mentioned operation (ii) is shown in FIG. 5. An illustration showing a function $f$ being fit to the histogram 500 (in accordance with the above-mentioned operation (iii)) is provided in FIG. 6, which allows the peak to be recovered or otherwise determined. As can be seen by comparing FIG. 4 and FIG. 6, the peaks 402, 602 thereof are not the same. The peak 602 of FIG. 6 allows for a more accurate determination of the distance D from the lidar system to the object.

Example 1

The bin width bin_width is five hundred picoseconds (or 0.5 nanoseconds) and thirty trials are used. Each trial occurs every microsecond. A flat wall is twenty meters away from the lidar system. The ToF principle is used here to calculate the distance D between the lidar system and the flat wall. The ToF principle states that the distance D can be computed based on the time difference between the emission of the light signal from the lidar system and the light signal's return to the lidar system.

During operation, the lidar system emits light that travels to the flat wall, reflects off of the flat wall, and travels back to the lidar system. The ToF or b−a is approximately 133.425 nanoseconds. The trials will fall in a bin determined by dividing the ToF by the bin_width (i.e., bin=133.425/0.5=266.85). Assuming a pulse width of 0.5 ns (one bin), the detection timestamps will fall between two bins 266 and 267. Thus, the results of the thirty trials are assigned to bin $B_{266}$ and bin $B_{267}$ in proportion depending on the arrival times of the received pulses at the photodetectors. All the detections will be assigned to bin $B_{266}$. A peak finding algorithm naively will find that the flat wall is D meters from the lidar system, where D is defined by the following mathematical equation (3).

$$D=(b\_\text{number}+0.5)*((\text{bin\_width}/2)*c) \quad (3)$$

where c is the speed of light in air (i.e., 299,792,458 meters per second). So, in the present example, this equation is solved as shown below.

$$D=(266+0.5)*((500/2)*c)=19.97 \text{ meters}$$

This distance computation has an error of about three centimeters.

In the present solution, $f(a,b)$ is a ramp function that repeats every N number of pulses (where N is an integer) and an amplitude of each step is delta picoseconds. So, $f(a,b)$ can be defined by the following mathematical equation (4).

$$f(a,b)=b+\text{delta}*\text{mod}(i,N) \quad (4)$$

where b represents a time when a photodiode avalanches, i represents a value between zero and N−1, N represents a number of pulses for which the ramp function repeats. The value of delta can include, but is not limited to, sixteen picoseconds. Thus, mathematical equation (4) can be written as mathematical equation (5) in this scenario.

$$f(a,b)=b+16*\text{mod}(i,N) \quad (5)$$

The thirty returns accumulate the delay offset $t_{offset}$ shown in TABLE 1. In TABLE 1, it is assumed that each return arrives at the end of a microsecond period and all units are in picoseconds. The period is sixteen picoseconds.

TABLE 1

| 0 | 16 | 32 | 48 | 64 | 80 | 96 | 112 | 128 | 144 |
|---|---|---|---|---|---|---|---|---|---|
| 160 | 176 | 192 | 208 | 224 | 240 | 256 | 272 | 288 | 304 |
| 320 | 336 | 352 | 368 | 384 | 400 | 416 | 432 | 448 | 464 |

If the flat wall is added at twenty meters, the returns appear to arrive after the time delays shown in TABLE 2. Each value v of TABLE 2 represents a ToF in picoseconds and is computed in accordance with the following mathematical equation (6)

$$v=((2*20)/c)*(t_{offset}*1e-12) \quad (6)$$

So, for example, the first value of TABLE 2 is computed as follows: 40/c. The second value in TABLE 2 is computed as follows: (40/c)+(16*1e−12).

TABLE 2

| | | | | | | |
|---|---|---|---|---|---|---|
| 133425.638 | 133441.638 | 133457.638 | 133473.638 | 133489.638 | 133505.638 | 133521.638 |
| 133537.638 | 133553.638 | 133569.638 | 133569.638 | 133585.638 | 133601.638 | 133617.638 |
| 133633.638 | 133649.638 | 133665.638 | 133681.638 | 133697.638 | 133713.638 | 133713.638 |
| 133729.638 | 133745.638 | 133761.638 | 133777.638 | 133793.638 | 133809.638 | 133825.638 |
| 133841.638 | 133857.638 | 133777.638 | 133793.638 | | | |

Quantizing to five hundred picosecond bins, the following TABLE 3 is produced from TABLE 2. The quantization is defined by the following mathematical equation (7).

$$Q=\text{floor}(v/500) \quad (7)$$

where v represents a time delay for a return shown in TABLE 2. For example, the first value of the first row in TABLE 3 is determined by computing floor(133425.638/500)=266, while the sixth value of the first row in TABLE 3 is determined by computing floor(133505.638/500)=267.

TABLE 3

| | | | | | | | | | |
|---|---|---|---|---|---|---|---|---|---|
| 266 | 266 | 266 | 266 | 266 | 267 | 267 | 267 | 267 | 267 |
| 267 | 267 | 267 | 267 | 267 | 267 | 267 | 267 | 267 | 267 |
| 267 | 267 | 267 | 267 | 267 | 267 | 267 | 267 | 267 | 267 |

If the above TABLE 3 is summarized, there are five observations at time $t_1$ (for example, 266 nanoseconds) and twenty-five observations at time $t_2$ (for example, 267 nanoseconds). Using linear interpolation, an offset O can be defined by the following mathematical equation (8).

$$O=t_1+n_{observations\text{-}t2}/n_{observations\text{-}total}*t_{delay\text{-}last\text{-}return}/\text{bin\_width}+0.5 \quad (8)$$

wherein $n_{observations\text{-}t2}$ represents the number of observations at time $t_2$, $n_{observations\_total}$ represents the total number of observations at any given time, and $t_{delay\text{-}last\text{-}return}$ represents a time delay for a last return (which is 464 in this example as shown in TABLE 1). In the present example, the offset is computed as follows.

$$O=266+25/30*464/500+0.5=267.27$$

Note further that the clock skew must be compensated for over the full observation time period, and that the value added to the measurements by the clock skew function is the average of time delay biases $t_{delay}$. In the present example, this average value is obtained by averaging the time delay biases $t_{delay}$ of TABLE 1 as shown by below mathematical equation (9).

$$\begin{aligned}O_{average}=&(0+16+32+48+64+80+96+112+128+144+\\&160+176+192+208+224+240+256+272+288+\\&304+320+336+352+368+384+400+416+432+\\&448+464)/30=232 \text{ picoseconds}\end{aligned} \quad (9)$$

Since the bin width is 500 picoseconds, $O_{average}$ can be converted into the bin domain as shown by following mathematical equation (10).

$$O_{average\text{-}bin}=O_{average}/\text{bin\_width} \quad (10)$$

where $O_{average\text{-}bin}$ represents the average value in the bin domain. In the present example, $O_{average\text{-}bin}$ is computed as follows: $O_{average\text{-}bin}=232/500=0.464$ bin. A conclusion can be made that the correct peak location of a histogram is defined by the following mathematical equation (11).

$$H_{peak}=O-O_{average\text{-}bin} \quad (11)$$

In the present example, $H_{peak}$ is computed as follows: 267.27−0.464=266.8, which corresponds to a surface at 19.996 meters away.

Note that at no point did any values need to be measured below bin precision directly. This can be calculated entirely from knowledge off and the distribution properties across the bins. The above example has reduced the error for distance D from three centimeters to less than one centimeter.

It is also possible to introduce a fixed half bin offset to the transmitted pulse to convert the floor operation to round: h(a, b)=round((b−a)/bin_width). Below EXAMPLE 2 demonstrates the improvement of range accuracy under this setup.

Example 2

The bin widths are five hundred picoseconds (or 0.5 nanoseconds) and thirty trials are used. Each trial occurs every microsecond. A flat wall is eight meters away from the lidar system. The Time-of-Flight (ToF) principle is used here to calculate the distance D between the lidar system and the flat wall. The ToF principle states that the distance D can be computed based on the time difference between the emission of the light signal from the lidar system and the light signal's return to the lidar system.

During operation, the lidar system emits light that travels to flat wall, reflects off of the flat wall, and travels back to the lidar system. The ToF is approximately 53.37 nanoseconds. The trials will fall in a bin determined by dividing the ToF by the bin_width (i.e., bin=53.37/0.5=107). A peak finding algorithm naively finds that the flat wall is D meters from the lidar system, where D is defined by the above provided mathematical equation (3). So, in the present example, this equation is solved as shown below.

$$D=(107+0.5)*((500/2)*(3*108))=8.062 \text{ meters}$$

This distance computation has an error of about 1.9 centimeters.

In the present solution, ƒ(a,b) is a sine function with a period of sixty microseconds and an amplitude of one thousand picoseconds. So, ƒ(a,b) can be defined by the following mathematical equation (12).

$$f(a,b)=1000*\sin((b*2\pi/60)) \quad (12)$$

where b represents a time when a photodiode avalanches.

This function approximates a parabola over a sampling period. The thirty returns accumulate the delay biases shown in TABLE 4. An assumption is made that each return arrives at the end of a microsecond period and all units are in picoseconds. So, b is a value of 1, 2, 3, 4, 5, 6, 7, 8, 9, 10, 11, 12, 14, and so on. In accordance with mathematical equation (10), a first value in the first row of TABLE 4 is determined by computing $1000*\sin((1)*(2\pi/60))=104.5$, and a second value in the first row of TABLE 4 is determined by computing $1000*\sin(2*(2\pi/60))=207.9$.

TABLE 4

| 104.5 | 207.9 | 309.0 | 406.7 | 500.0 | 587.8 | 669.1 | 743.1 | 809.0 | 866.0 |
|---|---|---|---|---|---|---|---|---|---|
| 913.5 | 951.1 | 978.1 | 994.5 | 1000.0 | 994.5 | 978.1 | 951.1 | 913.5 | 866.0 |
| 809.0 | 743.1 | 669.1 | 587.8 | 500.0 | 406.7 | 309.0 | 207.9 | 104.5 | 0.0 |

If the flat wall is added at eight meters, the returns appear to arrive after the delays shown in TABLE 5. Each value v of TABLE 5 represents a ToF in picoseconds and is computed in accordance with the following mathematical equation (13)

$$v=((2*8)/c)+(t_{delay}*1e-12) \quad (13)$$

where the speed of light c is 299792458 meters per second. So, for example, the first value of TABLE 5 is computed as follows: $(16/c)\pm(104.5*1e-12)$. The second value in TABLE 5 is computed as follows: $(16/c)+(207.9*1e-12)$.

TABLE 5

| 53474.8 | 53578.2 | 53679.3 | 53777.0 | 53870.3 | 53958.0 | 54039.4 | 54113.4 | 54179.3 | 54236.3 |
|---|---|---|---|---|---|---|---|---|---|
| 54283.8 | 54321.3 | 54348.4 | 54364.8 | 54370.3 | 54364.8 | 54348.4 | 54321.3 | 54283.8 | 54236.3 |
| 54179.3 | 54113.4 | 54039.4 | 53958.0 | 53870.3 | 53777.0 | 53679.3 | 53578.2 | 53474.8 | 53370.3 |

Quantizing to five hundred picosecond bins, the following TABLE 6 is produced from TABLE 5. The quantization is defined by the following mathematical equation (14).

$$Q=\text{round}(v/500) \quad (14)$$

where v represents a time delay for a return shown in TABLE 5. For example, the first value of the first row in TABLE 6 is determined by computing $53474.8/500=106.9$ which is rounded to 107, while the fourth value of the first row in TABLE 6 is determined by computing $53777.0/500=107.554$ which is rounded to 108.

TABLE 6

| 107 | 107 | 107 | 108 | 108 | 108 | 108 | 108 | 108 | 108 |
|---|---|---|---|---|---|---|---|---|---|
| 109 | 109 | 109 | 109 | 109 | 109 | 109 | 109 | 109 | 108 |
| 108 | 108 | 108 | 108 | 108 | 108 | 107 | 107 | 107 | 107 |

TABLE 6 can be summarized as having seven observations at time $t_1=107$, fourteen observations at time $t_2=108$, and nine observations at time $t_3=109$. If a parabola fit to these values is performed to recover the vertex, it can be found that an offset O can be defined by the following mathematical equation (15).

$$O=0.5*((o_3-o_1)/(o_1-2*o_2+o_3)) \quad (15)$$

wherein of represents the number of observations at time $t_1$, $o_2$ represents the number of observations at time $t_2$, and $o_3$ represents the number of observations at time $t_3$, a time delay for a last return (see TABLE 1). In the present example, the offset is computed as follows:

$$O=0.5*((9-7)/(7-2*14+9))=-0.0833 \text{ (or } -\tfrac{1}{12}\text{)}.$$

Thus, the peak of the histogram lies at $108-\tfrac{1}{12} \sim 107.916$. The clock skew over the full observation period must be compensated for and that value added to the measurements by the clock skew function. The clock skew function is defined by the following mathematical equation (16).

$$\int_0^{30} 1000 \text{ ps}*\sin(b*2\pi/60us) \approx 19099 \quad (16)$$

The result of this computation is not the sum of TABLE 4 because in actual practice there is no way of measuring precisely the values in TABLE 5. The result corresponds to an average measurement offset of 636.63 picoseconds (i.e., 19099/30) or about 1.273 bins (i.e., 636.63/500). A conclusion can be made that the correct peak location is 106.643 (i.e., 107.916−1.273), which corresponds to a surface at 7.99 meters away. This distance D is computed as follows: $D=8-((636.63/500)*0.0015 \text{ meters})=7.99$ meters. Note that at no point did values below the bin need to be measured directly with precision. These values can be calculated entirely from knowledge off and the distribution properties across the bins. The parabola fit is trivial and uses a very minor spread across the bins (only one bin in each direction), and a parabola is not a perfect approximation of a sine—but still shows that the present solution has reduced an error in D from 1.9 centimeters to 0.8 centimeters.

Many choices off are possible. The function f ideally should have (but does not strictly require) features that provide (i) smooth and continuous derivatives that point toward the true peak from both sides, (ii) easy generation and control, (iii) and tolerance toward small inaccuracies in generation. For instance, function f could include a sawtooth function or a sine wave function. Function f could also comprise a ramp function or other function that does not change gradient sign precisely on the period of the sampling. The width of the sample spread induced is a tradeoff—more spread reduces the amplitude of the peak, making it harder to recover, but also produces higher depth accuracy due to better gradient information encoded in the histogram. Note that recovery of the peak is not limited to approximating f. The present method injects gradient information into the histogram, which means that many types of optimization may be deployed to find the peak. For example, with spreads greater than one bin on each side, optimizers using higher order derivatives may be employed.

The distribution of returns that is observed in real scenes is not perfect and is a convolution of the scene geometry with various noise sources (for example, atmospheric, optical element imperfections, etc.). The scene geometry that a photodiode's frustum over the observation time projects onto is likely more complex than a flat wall. One could, for instance, model this as h(a, s(a, b)), where s describes how the scene interacts with the photon in a particular return. Recovery of sub-bin depth estimation is thus dependent on the information injected into the histogram by this method being stronger than scene-dependent effects or noise. The achievability of this in practice is dependent on the number of laser returns and the width of the bin. If sufficient returns are used, a subset of the returns may additionally be used to compensate for s. For instance, the histogram may be scaled to produce sub-bin depth as a function of a naive histogram without clock drift. Another instantiation of the present solution might use two independent clocks, one with and one without drift, to achieve the same effect with half of the required returns. The present solution permits recovery of depth at high accuracy despite fundamental physical limitations on accuracy of timers and timing bins.

Figure 7:
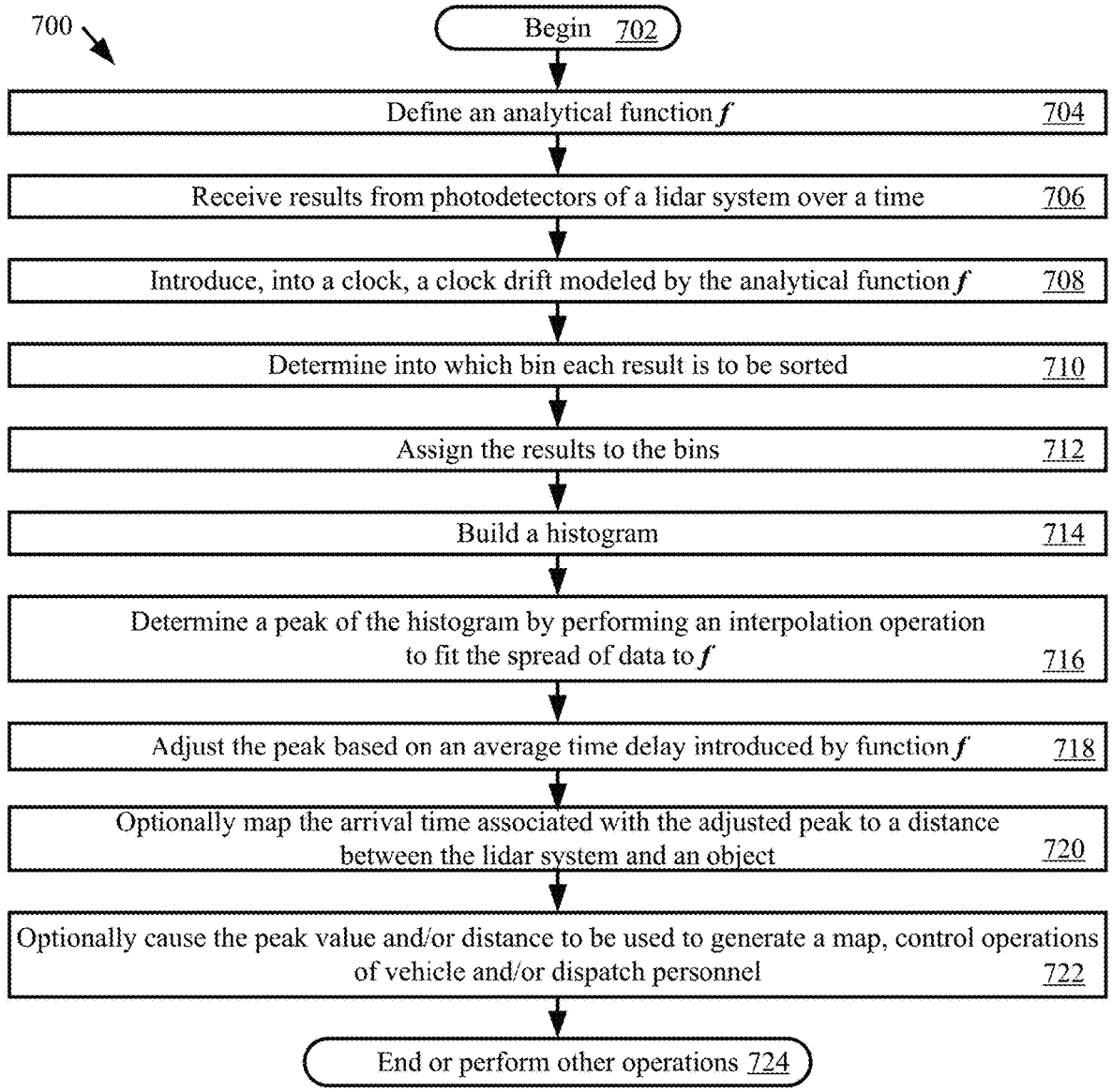
FIG. 7 provides a flow diagram of a method for operating the lidar system of FIG. 1.

FIG. 7 provides a flow diagram of an illustrative method 700 for operating a lidar system (for example, lidar system 100 of FIG. 1). Method 700 can be entirely or partially performed by a computing device (for example, analyzer 114 of FIG. 1 and/or processor 122 of FIG. 1) of the lidar system and/or a computer system external to and/or remote from the lidar system (for example, a vehicle's on-board computing device).

Method 700 begins with 702 and continues with 704 where an analytical function $f$ is defined. The analytical function $f$ describes: a relationship between a time that light is emitted from the lidar system and an avalanche time of a photodetector of the lidar system; and/or spreads results (for example, results $p_1, p_2, \ldots, p_X$ of FIG. 2) of the lidar system across multiple bins in a known manner using parameter(s) that allow a histogram (for example, histogram 500 of FIG. 5) to be fit to the function via a fitting, curve fitting and/or interpolation process. The analytical function can include, but is not limited to, a ramp function, a sawtooth function, and/or a sine wave function. The parameter(s) can include, but is(are) not limited to, the time that light is emitted from the lidar system and the avalanche time of the photodetector of the lidar system. The fitting, curve fitting and/or interpolation process can include, but is not limited to, a linear interpolation (for example, when $f$ is a ramp function) and/or a parabolic interpolation (for example, when $f$ is a sign wave function). In some scenarios, the analytical function $f$ is defined by mathematical equation (4) provided above or mathematical equation (12) provided above.

In 706, the computing device/system receives results (for example, results $p_1, p_2, \ldots, p_X$ of FIG. 2) from photodetectors (for example, photodetectors 126 of FIG. 1) of the lidar system over time. Each result is associated with a time of arrival of a pulse at the respective photodetector.

In 708, the computing device/system introduces, into a clock (for example, clock 124 of FIG. 1) a clock drift modeled by the analytical function $f$ that was defined in 704. The clock drift can include, but is not limited to, a time period equal to, less than or greater than a bin width (for example, 500 picoseconds or 0.5 nanoseconds). This operation of 708 results in an adjustment of the times of arrivals for the pulses by an clock drift modeled by the analytical function $f$.

The computing device/system performs operations in 710 to determine to which bin (for example, bin $128_1$, $128_2$ or $128_N$ of FIG. 3) each result is to be assigned based on the time of arrival for the pulse received at a respective photodetector of the lidar system or based on a distance corresponding to the time of arrival for the pulse received at the respective photodetector. The results are then assigned to the bins as shown by 712.

A histogram (for example, histogram 500 of FIG. 5) is built in 714. A peak of the histogram is determined in 716 by performing a fitting, curve fitting and/or interpolation operation to fit the spread of data to the analytical function $f$. Any known or to be known fitting, curve fitting and/or interpolation process can be used here depending on how the analytical function $f$ is defined in 704. For example, if the analytical function $f$ is a ramp function, then the interpolation process can include a linear interpolation process. In contrast, if the analytical function $f$ is a sign wave function, then the interpolation process can include a parabolic interpolation process.

In 718, the peak is modified by an average time delay introduced by the analytical function $f$. This modification can be achieved via a subtraction operation. In the above EXAMPLE 1, the average time delay is the average of the time delays listed in TABLE 1. In EXAMPLE, 2, the average time delay is the average of the time delays listed in TABLE 4.

In 720, the arrival time associated with the adjusted peak is optionally mapped to a distance value. This mapping can be achieved, for example, using look up table (LUT) operations in which the arrival time is used as an index to the LUT(s), i.e., distance values are respectively associated with arrival times in the LUT(s). The distance value represents a distance between the lidar system and an object. The peak value and/or the distance value are optionally used in 722 to generate a map, control operations of a vehicle and/or dispatch personnel to a geographic location. Subsequently, 724 is performed where method 700 ends or other operations are performed.

The above described lidar system can be used in various applications. The present solution will now be described in the context of autonomous vehicles. However, the present solution is not limited to autonomous vehicle applications. The present solution can be used in other applications such as robotic applications (for example to control movements of articulating arms) and/or system performance applications.

Figure 8:
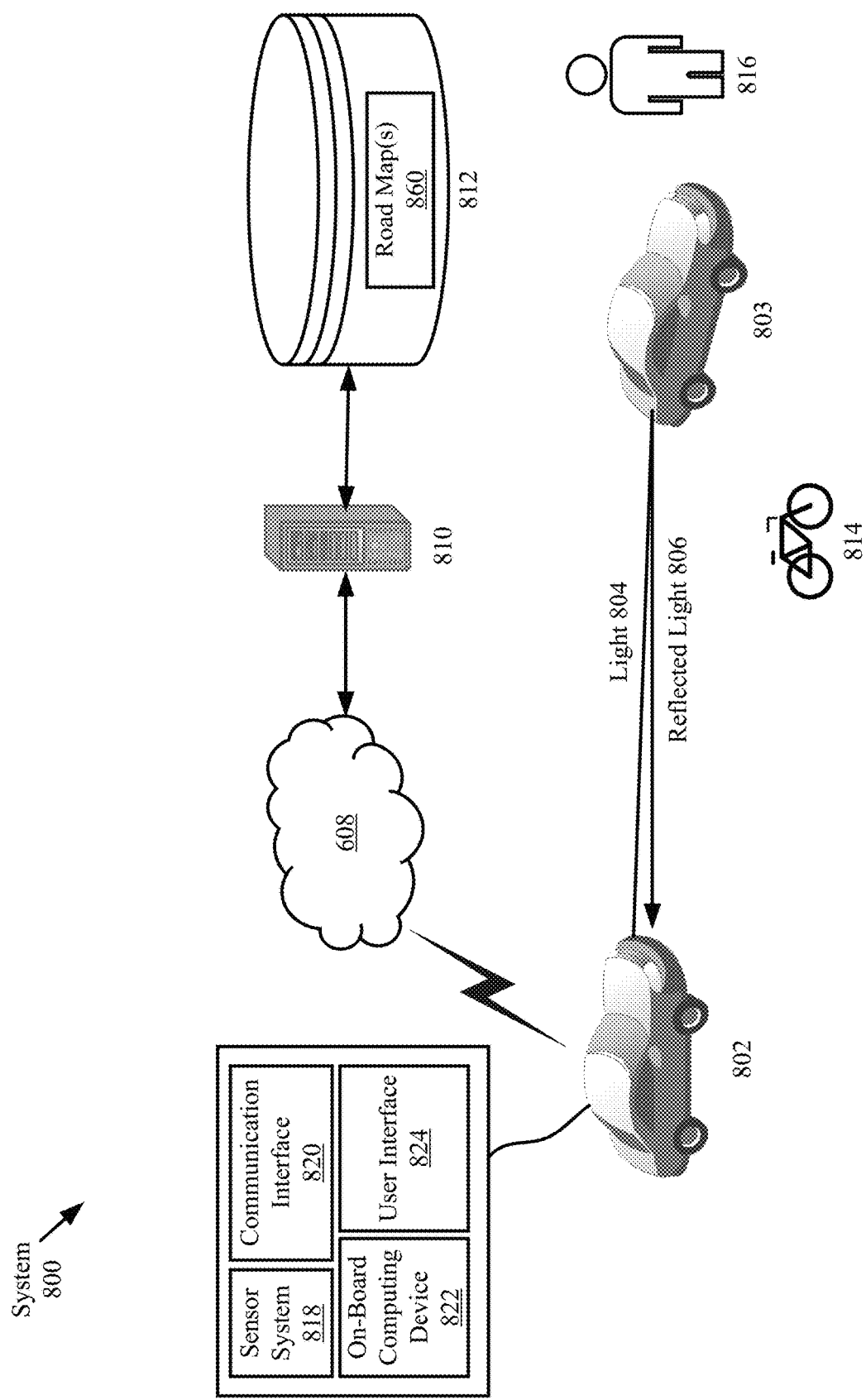
FIG. 8 provides an illustration of a system.

FIG. 8 illustrates an example system 800, in accordance with aspects of the disclosure. System 800 comprises a vehicle 802 which is caused to travel along a road in a semi-autonomous or autonomous manner. Vehicle 802 is also referred to herein as an AV 802. The AV 802 can include, but is not limited to, land vehicles (as shown in FIG. 8), aircraft, watercraft, sub terrenes, spacecraft, drones and/ or an articulating arm (for example, with a gripper at a free end). As noted above, except where specifically noted this disclosure is not necessarily limited to AV embodiments, and it may include non-autonomous vehicles in some embodiments.

AV 802 is generally configured to detect objects 803, 814, 816 in proximity thereto. The objects can include, but are not limited to, a vehicle 803, a cyclist 814 (such as a rider of a bicycle, electric scooter, motorcycle, or the like) and/or a pedestrian 816.

As illustrated in FIG. 8, the AV 802 may include a sensor system 818, an on-board computing device 822, a communications interface 820, and a user interface 824. AV 802 may further include certain components (as illustrated, for example, in FIG. 8) included in vehicles, which may be controlled by the on-board computing device 822 using a variety of communication signals and/or commands, such as, for example, acceleration signals or commands, deceleration signals or commands, steering signals or commands, braking signals or commands, etc.

The sensor system 818 may include one or more sensors that are coupled to and/or are included within the AV 802, as illustrated in FIG. 8. For example, such sensors may include, without limitation, a lidar system, a RADAR system, a laser detection and ranging (LADAR) system, a sound navigation and ranging (SONAR) system, camera(s) (for example, visible spectrum camera(s), infrared camera(s), etc.), temperature sensors, position sensors (for example, a global positioning system (GPS), etc.), location sensors, fuel sensors, motion sensors (for example, an inertial measurement unit (IMU), wheel speed sensors, etc.), humidity sensors, occupancy sensors, and/or the like. The sensors are generally configured to generate sensor data. The sensor data can include information that describes the location of objects within the surrounding environment of the AV 802, information about the environment itself, information about the motion of the AV 802, information about a route of the vehicle, and/or the like. As AV 802 travels over a surface (for example, a road), at least some of the sensors may collect data pertaining to the surface.

As will be described in greater detail, AV 802 may be configured with a lidar system (for example, lidar system 100 of FIG. 1). The lidar system may be configured to transmit a light pulse 804 to detect objects located within a distance or range of distances of AV 802. Light pulse 804 may be incident on one or more objects (for example, AV 803) and be reflected back to the lidar system. Reflected light pulse 806 incident on the lidar system may be processed to determine a distance of that object to AV 802. The reflected light pulse 806 may be detected using, in some scenarios, a photodetector or array of photodetectors positioned and configured to receive the light reflected back into the lidar system. Lidar information, such as detected object data, is communicated from the lidar system to the on-board computing device 822. The AV 802 may also communicate lidar data to a remote computing device 810 (for example, a cloud processing system) over a network 808. Computing device 810 may be configured with one or more servers to process one or more processes of the technology described herein. Computing device 810 may also be configured to communicate data/instructions to/from AV 802 over network 808, to/from server(s) and/or database(s) 812.

It should be noted that the lidar systems for collecting data pertaining to the surface may be included in systems other than the AV 802 such as, without limitation, other vehicles (autonomous or driven), robots, satellites, etc.

Network 808 may include one or more wired or wireless networks. For example, the network 808 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 802 may retrieve, receive, display, and edit information generated from a local application or delivered via network 808 from the database 812. Database 812 may be configured to store and supply raw data, indexed data, structured data, map data, program instructions or other configurations as is known.

The communications interface 820 may be configured to allow communication between AV 802 and external systems, such as, for example, external devices, sensors, other vehicles, servers, data stores, databases, etc. The communications interface 820 may utilize any now or hereafter known protocols, protection schemes, encodings, formats, packaging, etc. such as, without limitation, Wi-Fi, an infrared link, Bluetooth, etc. The user interface 824 may be part of peripheral devices implemented within the AV 802 including, for example, a keyboard, a touch screen display device, a microphone, and a speaker, etc. The vehicle also may receive state information, descriptive information or other information about devices or objects in its environment via the communication interface 820 over communication links such as those known as vehicle-to-vehicle, vehicle-to-object or other V2X communication links. The term "V2X" refers to a communication between a vehicle and any object that the vehicle may encounter or affect in its environment.

As noted above, the AV 802 may detect objects 803, 814, 816 in proximity thereto. Such object detections are facilitated using the sensor data generated by the sensor system 818 (for example, lidar datasets generated by an onboard lidar detector). The sensor data is processed by the onboard computing device 822 of the AV 802 and/or by the remote computing device 810 to obtain one or more predicted trajectories for the object given the sensor data. The predicted trajectories for the object may then be used to generate a trajectory for the AV 802. The AV 803 may then be caused by the on-board computing device to follow the trajectory.

Figure 9:
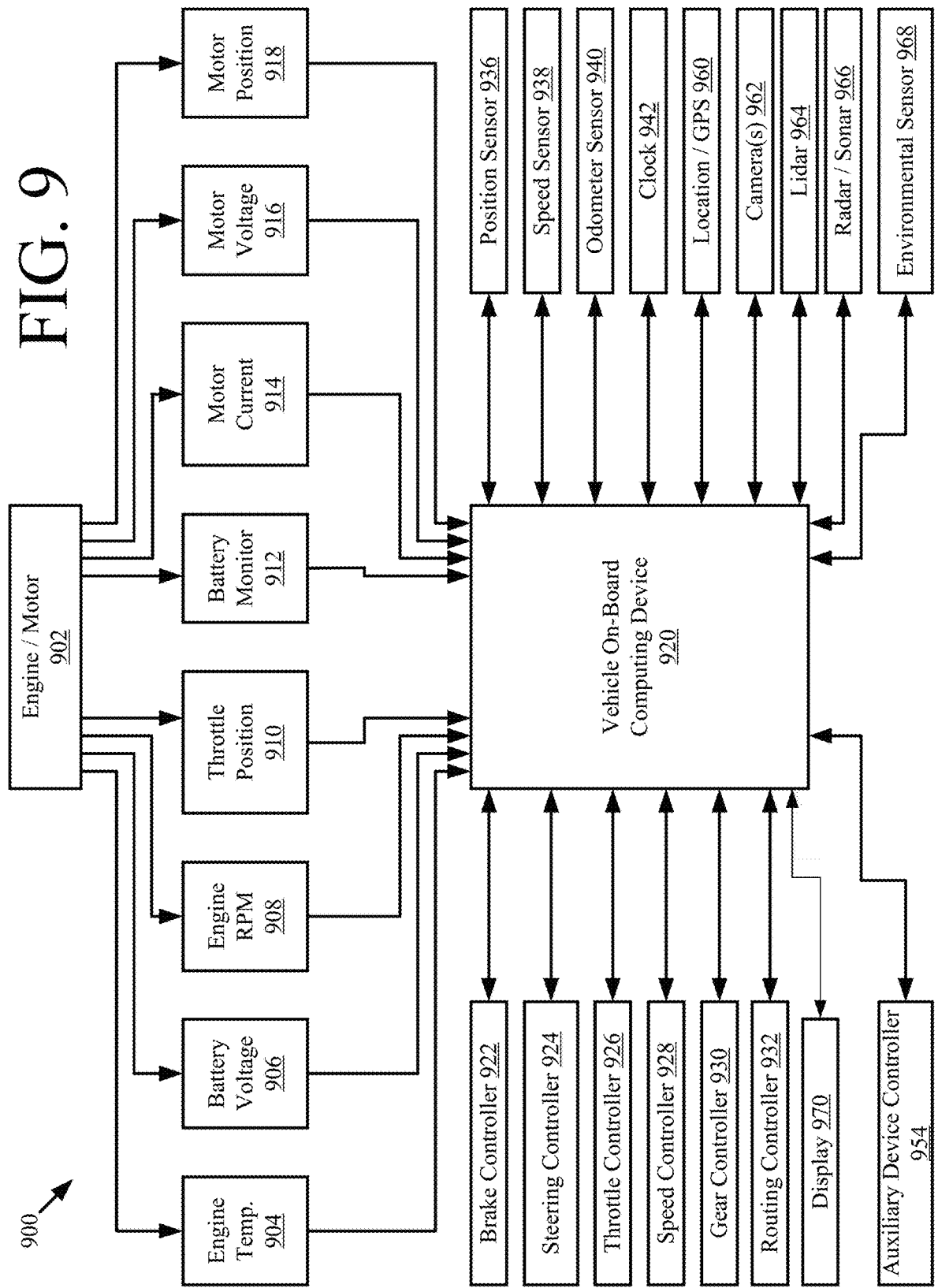
FIG. 9 provides a more detailed illustration of an autonomous vehicle.

FIG. 9 illustrates a system architecture 900 for a vehicle, in accordance with aspects of the disclosure. Vehicles 802 and/or 803 of FIG. 8 can have the same or similar system architecture as that shown in FIG. 9. Thus, the following discussion of system architecture 900 is sufficient for understanding vehicle(s) 802, 603 of FIG. 8. However, other types of vehicles are considered within the scope of the technology described herein and may contain more or less elements as described in association with FIG. 9. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 9, the system architecture 900 includes an engine or motor 902 and various sensors 904-918 for measuring various parameters of the vehicle. In gas-powered or hybrid vehicles having a fuel-powered engine, the sensors may include, for example, an engine temperature sensor 904, a battery voltage sensor 906, an engine Revolutions Per Minute (RPM) sensor 908, and a throttle position sensor 910. If the vehicle is an electric or hybrid vehicle, then the vehicle may have an electric motor, and accordingly will have sensors such as a battery monitoring system 912 (to measure current, voltage and/or temperature of the battery), motor current 914 and voltage 916 sensors, and motor position sensors 918 such as resolvers and encoders 918.

Operational parameter sensors that are common to both types of vehicles include, for example: a position sensor 936 such as an accelerometer, gyroscope and/or inertial measurement unit; a speed sensor 938; and an odometer sensor 940. The vehicle also may have a clock 942 that the system uses to determine vehicle time during operation. The clock 942 may be encoded into the vehicle on-board computing device 920, it may be a separate device, or multiple clocks may be available.

The vehicle also will include various sensors that operate to gather information about the environment in which the vehicle is traveling. These sensors may include, for example: a location sensor 960 (for example, a GPS device); object detection sensors such as one or more cameras 962; a lidar sensor system 964; and/or a RADAR and/or SONAR system 966. The sensors also may include environmental sensors 968 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 920. The vehicle on-board computing device 920 may be implemented using the computer system of FIG. 10. The vehicle on-board computing device 920 analyzes the data captured by the sensors and optionally controls operations of the vehicle based on results of the analysis. For example, the vehicle on-board computing device 920 may control: braking via a brake controller 922; direction via a steering controller 924; speed and acceleration via a throttle controller 926 (in a gas-powered vehicle) or a motor speed controller 928 (such as a current level controller in an electric vehicle); a differential gear controller 930 (in vehicles with transmissions); and/or other controllers. Auxiliary device controller 954 may be configured to control one or more auxiliary devices, such as testing systems, auxiliary sensors, mobile devices transported by the vehicle, etc.

Geographic location information may be communicated from the location sensor 960 to the vehicle on-board computing device 920, which may then access a map of the environment that corresponds to the location information to determine known fixed features of the environment such as streets, buildings, stop signs and/or stop/go signals. Captured images from the cameras 962 and/or object detection information captured from sensors such as lidar system 964 is communicated from those sensors to the vehicle on-board computing device 920. The object detection information and/or captured images are processed by the vehicle on-board computing device 920 to detect objects in proximity to the vehicle. Any known or to be known technique for making an object detection based on sensor data and/or captured images can be used in the embodiments disclosed in this document.

Lidar information is communicated from lidar system 964 to the vehicle on-board computing device 920. Additionally, captured images are communicated from the camera(s) 962 to the vehicle on-board computing device 920. The lidar information and/or captured images are processed by the vehicle on-board computing device 920 to detect objects in proximity to the vehicle. The manner in which the object detections are made by the vehicle on-board computing device 920 includes such capabilities detailed in this disclosure.

In addition, the system architecture 900 may include an onboard display device 970 that may generate and output an interface on which sensor data, vehicle status information, or outputs generated by the processes described in this document are displayed to an occupant of the vehicle. The display device may include, or a separate device may be, an audio speaker that presents such information in audio format.

The vehicle on-board computing device 920 may include and/or may be in communication with a routing controller 932 that generates a navigation route from a start position to a destination position for an autonomous vehicle. The routing controller 932 may access a map data store to identify possible routes and road segments that a vehicle can travel on to get from the start position to the destination position. The routing controller 932 may score the possible routes and identify a preferred route to reach the destination. For example, the routing controller 932 may generate a navigation route that minimizes Euclidean distance traveled or other cost function during the route and may further access the traffic information and/or estimates that can affect an amount of time it will take to travel on a particular route. Depending on implementation, the routing controller 932 may generate one or more routes using various routing methods, such as Dijkstra's algorithm, Bellman-Ford algorithm, or other algorithms. The routing controller 932 may also use the traffic information to generate a navigation route that reflects expected conditions of the route (for example, current day of the week or current time of day, etc.), such that a route generated for travel during rush-hour may differ from a route generated for travel late at night. The routing controller 932 may also generate more than one navigation route to a destination and send more than one of these navigation routes to a user for selection by the user from among various possible routes.

In some scenarios, the vehicle on-board computing device 920 may determine perception information of the surrounding environment of the vehicle. Based on the sensor data provided by one or more sensors and location information that is obtained, the vehicle on-board computing device 920 may determine perception information of the surrounding environment of the vehicle. The perception information may represent what an ordinary driver would perceive in the surrounding environment of a vehicle. The perception data may include information relating to one or more objects in the environment of the vehicle. For example, the vehicle on-board computing device 920 may process sensor data (for example, lidar data, RADAR data, camera images, etc.) in order to identify objects and/or features in the environment of vehicle. The objects may include, but are not limited to, traffic signals, roadway boundaries, other vehicles, pedestrians, and/or obstacles. The vehicle on-board computing device 920 may use any now or hereafter known object recognition algorithms, video tracking algorithms, and computer vision algorithms (for example, track objects frame-to-frame iteratively over a number of time periods) to determine the perception.

In those or other scenarios, the vehicle on-board computing device 920 may also determine, for one or more identified objects in the environment, the current state of the object. The state information may include, without limitation, for each object: a current location; a current speed; an acceleration; a current heading; a current pose; a current shape, size and/or footprint; an object type or classification (for example, vehicle. pedestrian, bicycle, static object, or obstacle); and/or other state information.

The vehicle on-board computing device 920 may perform one or more prediction and/or forecasting operations. For example, the vehicle on-board computing device 920 may predict future locations, trajectories, and/or actions of one or more objects. For example, the vehicle on-board computing device 920 may predict the future locations, trajectories, and/or actions of the objects based at least in part on perception information (for example, the state data for each object comprising an estimated shape and pose determined as discussed below), location information, sensor data, and/or any other data that describes the past and/or current state of the objects, the vehicle, the surrounding environment, and/or their relationship(s). For example, if an object is a vehicle and the current driving environment includes an intersection, the vehicle on-board computing device 920 may predict whether the object will likely move straight forward or make a turn. If the perception data indicates that the intersection has no traffic light, the vehicle on-board computing device 920 may also predict whether the vehicle may have to fully stop prior to entering the intersection.

In those or other scenarios, the vehicle on-board computing device 920 may determine a motion plan for the vehicle. For example, the vehicle on-board computing device 920 may determine a motion plan for the vehicle based on the perception data and/or the prediction data. Specifically, given predictions about the future locations of proximate objects and other perception data, the vehicle on-board computing device 920 can determine a motion plan for the vehicle that best navigates the vehicle relative to the objects at their future locations.

In those or other scenarios, the vehicle on-board computing device 920 may receive predictions and make a decision regarding how to handle objects and/or actors in the environment of the vehicle. For example, for a particular actor (for example, a vehicle with a given speed, direction, turning angle, etc.), the vehicle on-board computing device 920 decides whether to overtake, yield, stop, and/or pass based on, for example, traffic conditions, map data, state of the autonomous vehicle, etc. Furthermore, the vehicle on-board computing device 920 also plans a path for the vehicle to travel on a given route, as well as driving parameters (for example, distance, speed, and/or turning angle). That is, for a given object, the vehicle on-board computing device 920 decides what to do with the object and determines how to do it. For example, for a given object, the vehicle on-board computing device 920 may decide to pass the object and may determine whether to pass on the left side or right side of the object (including motion parameters such as speed). The vehicle on-board computing device 920 may also assess the risk of a collision between a detected object and the vehicle. If the risk exceeds an acceptable threshold, it may determine whether the collision can be avoided if the vehicle follows a defined vehicle trajectory and/or implements one or more dynamically generated emergency maneuvers in a time period (for example, N milliseconds). If the collision can be avoided, then the vehicle on-board computing device 920 may execute one or more control instructions to perform a cautious maneuver (for example, mildly slow down, accelerate, change lane, or swerve). In contrast, if the collision cannot be avoided, then the vehicle on-board computing device 920 may execute one or more control instructions for execution of an emergency maneuver (for example, brake and/or change direction of travel).

As discussed above, planning and control data regarding the movement of the vehicle is generated for execution. The vehicle on-board computing device 920 may, for example: control braking via a brake controller; direction via a steering controller; speed and acceleration via a throttle controller (in a gas-powered vehicle) or a motor speed controller (such as a current level controller in an electric vehicle); change gears via a differential gear controller (in vehicles with transmissions); and/or control other operations via other controllers.

Figure 11:
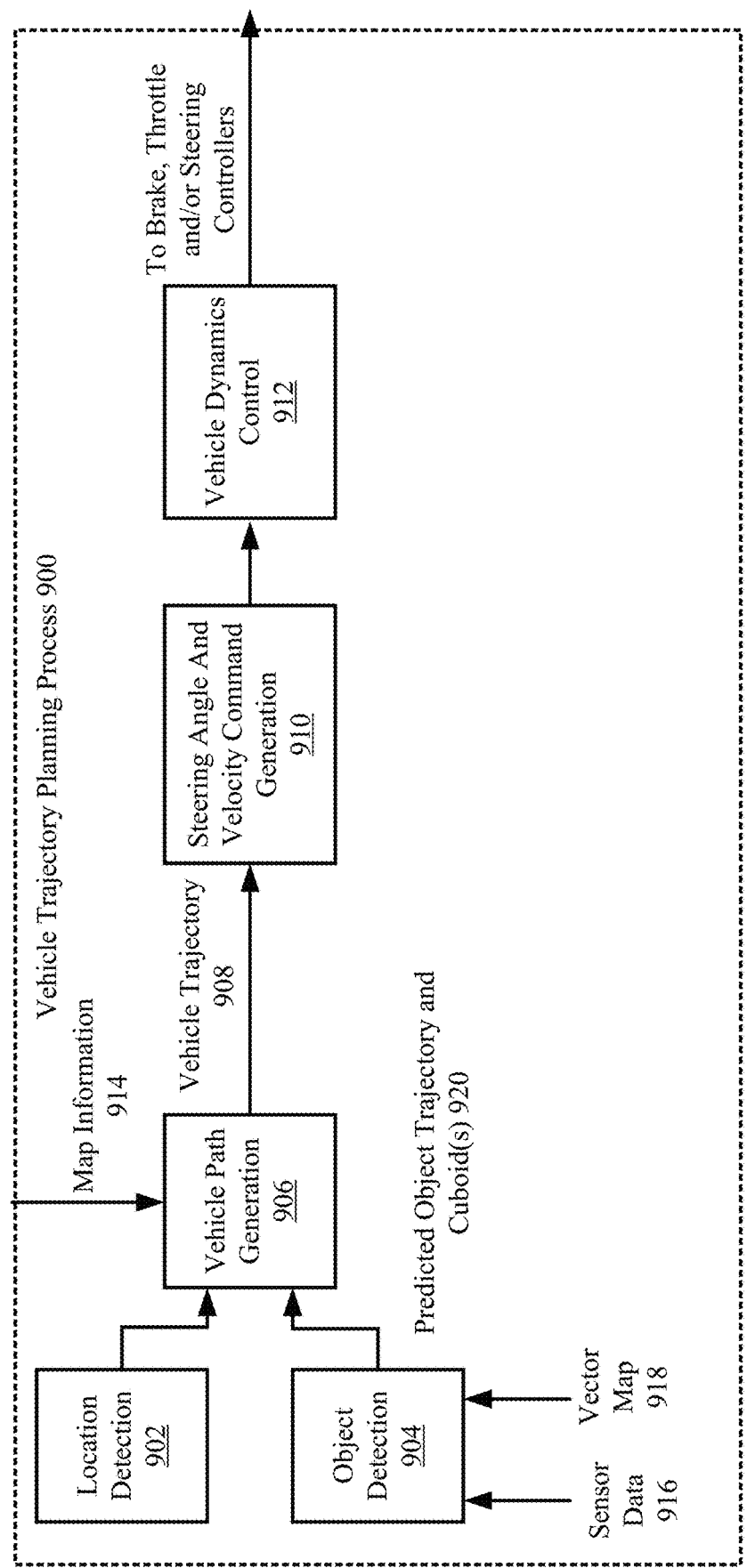
FIG. 11 provides a block diagram of an illustrative vehicle trajectory planning process.

The present solution can be implemented, for example, using one or more computer systems, such as computer system 1000 shown in FIG. 11. Computer system 1000 can be any computer capable of performing the functions described herein. The on-board computing device 822 of FIG. 8, computing device 810 of FIG. 8, robotic device(s) 852 of FIG. 8, mobile communication device(s) 856 of FIG. 8, and/or the vehicle on-board computing device 920 of FIG. 9 may be the same as or similar to computing system 1000. As such, the discussion of computing system 1000 is sufficient for understanding the devices 810, 822, 852, 856 and 920 of FIGS. 8-9.

Figure 10:
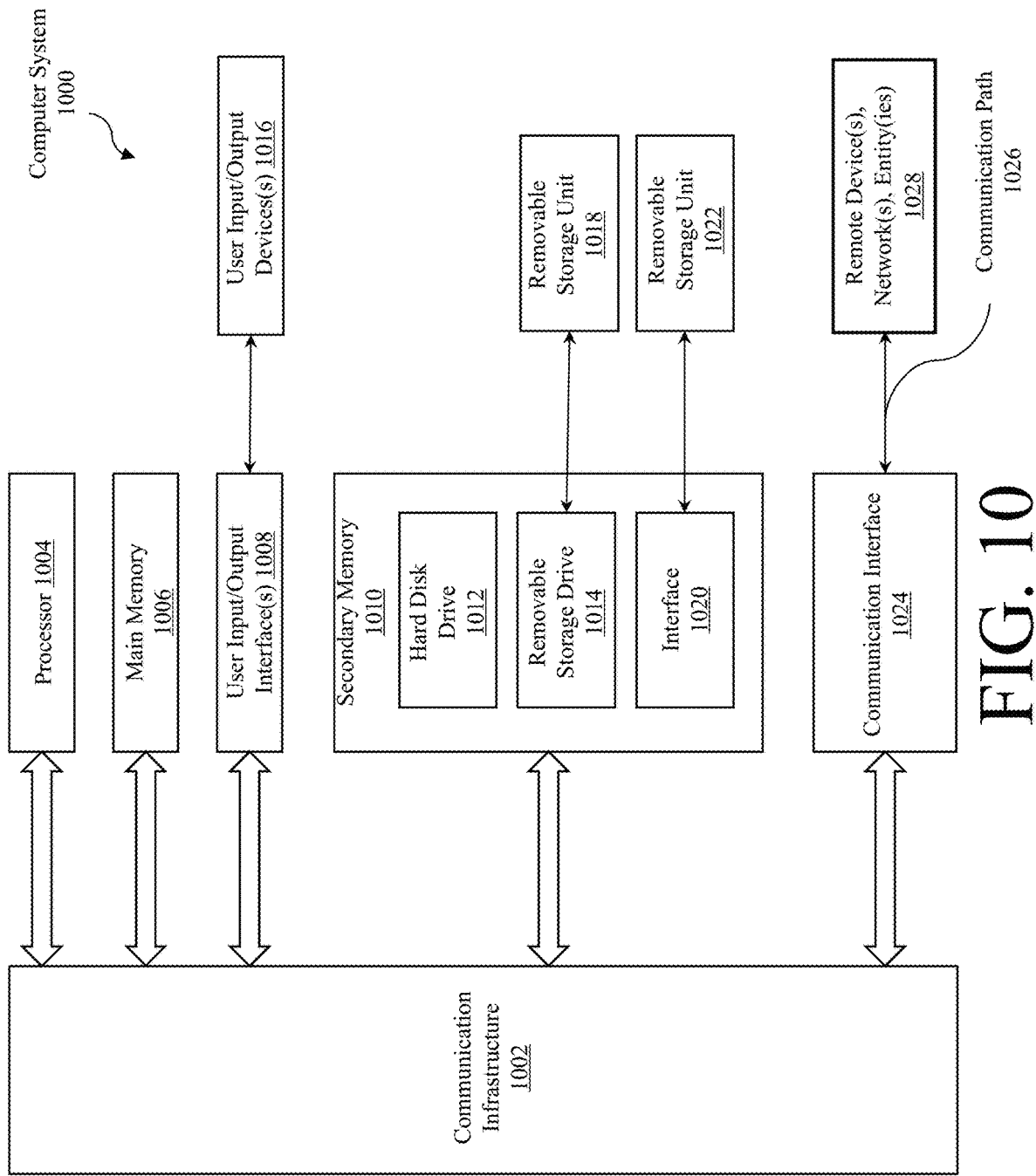
FIG. 10 provides an illustration of a computer system.

Computing system 1000 may include more or less components than those shown in FIG. 10. However, the components shown are sufficient to disclose an illustrative solution implementing the present solution. The hardware architecture of FIG. 10 represents one implementation of a representative computing system configured to operate a vehicle, as described herein. As such, the computing system 1000 of FIG. 10 implements at least a portion of the method(s) described herein.

Some or all components of the computing system 1000 can be implemented as hardware, software and/or a combination of hardware and software. The hardware includes, but is not limited to, one or more electronic circuits. The electronic circuits can include, but are not limited to, passive components (for example, resistors and capacitors) and/or active components (for example, amplifiers and/or microprocessors). The passive and/or active components can be adapted to, arranged to and/or programmed to perform one or more of the methodologies, procedures, or functions described herein.

Computer system 1000 includes one or more processors (also called central processing units, or CPUs), such as a processor 1004. Processor 1004 is connected to a communication infrastructure or bus 1002. One or more processors 1004 may each be a graphics processing unit (GPU). In some scenarios, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1016, such as monitors, keyboards, pointing devices, etc., that communicate with communication infrastructure 1002 through user input/output interface(s) 1008. Computer system 1000 further includes a main or primary memory 1006, such as random access memory (RAM). Main memory 1006 may include one or more levels of cache. Main memory 1006 has stored therein control logic (i.e., computer software) and/or data.

One or more secondary storage devices or memories 1010 may be provided with computer system 1000. Secondary memory 1010 may include, for example, a hard disk drive 1012 and/or a removable storage device or drive 1014. Removable storage drive 1014 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 1014 may interact with a removable storage unit 1018.

Removable storage unit 1018 includes a computer usable or readable storage device having stored thereon computer software (control logic) and/or data. Removable storage unit 1018 may be an external hard drive, a universal serial bus (USB) drive, a memory card such as a compact flash card or secure digital memory, a floppy disk, a magnetic tape, a compact disc, a DVD, an optical storage disk, and/or any other computer data storage device. Removable storage drive 1014 reads from and/or writes to removable storage unit 1014 in a well-known manner.

In some scenarios, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In some scenarios, a tangible, non-transitory apparatus or article of manufacture comprising a tangible, non-transitory computer usable or readable medium having control logic (software) stored thereon is also referred to herein as a computer program product or program storage device. This includes, but is not limited to, computer system 1000, main memory 1006, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use the present solution using data processing devices, computer systems and/or computer architectures other than that shown in FIG. 8. In particular, the present solution can operate with software, hardware, and/or operating system implementations other than those described herein.

FIG. 11 provides a block diagram that is useful for understanding how motion or movement of an AV is achieved in accordance with the present solution. All of the operations performed in blocks 1102-1112 can be performed by the on-board computing device (for example, on-board computing device 822 of FIGS. 8 and/or 920 of FIG. 9) of a vehicle (for example, AV 802 of FIG. 8).

In block 1102, a location of the AV (for example, AV 802 of FIG. 8) is detected. This detection can be made based on sensor data output from a location sensor (for example, location sensor 960 of FIG. 9) of the AV. This sensor data can include, but is not limited to, GPS data. The detected location of the AV is then passed to block 1106.

In block 1104, an object (for example, vehicle 803 of FIG. 8) is detected within proximity of the AV (for example, <100+ meters). This detection is made based on sensor data output from a camera (for example, camera 962 of FIG. 9) of the AV and/or a lidar system (for example, lidar system 964 of FIG. 9) of the AV. For example, image processing is performed to detect an instance of an object of a certain class (for example, a vehicle, cyclist or pedestrian) in an image. The image processing/object detection can be achieved in accordance with any known or to be known image processing/object detection algorithm.

Additionally, a predicted trajectory is determined in block 1104 for the object. The object's trajectory is predicted in block 1104 based on the object's class, cuboid geometry(ies), cuboid heading(s) and/or contents of a map 1118 (for example, sidewalk locations, lane locations, lane directions of travel, driving rules, etc.). The manner in which the cuboid geometry(ies) and heading(s) are determined will become evident as the discussion progresses. At this time, it should be noted that the cuboid geometry(ies) and/or heading(s) are determined using sensor data of various types (for example, 2D images, 3D lidar point clouds) and a vector map 1118 (for example, lane geometries). Techniques for predicting object trajectories based on cuboid geometries and headings may include, for example, predicting that the object is moving on a linear path in the same direction as the heading direction of a cuboid. The predicted object trajectories can include, but are not limited to, the following trajectories: a trajectory defined by the object's actual speed (for example, 1 mile per hour) and actual direction of travel (for example, west); a trajectory defined by the object's actual speed (for example, 1 mile per hour) and another possible direction of travel (for example, south, south-west, or X (for example, 40°) degrees from the object's actual direction of travel in a direction towards the AV) for the object; a trajectory defined by another possible speed for the object (for example, 2-10 miles per hour) and the object's actual direction of travel (for example, west); and/or a trajectory defined by another possible speed for the object (for example, 2-10 miles per hour) and another possible direction of travel (for example, south, south-west, or X (for example, 40°) degrees from the object's actual direction of travel in a direction towards the AV) for the object. The possible speed(s) and/or possible direction(s) of travel may be pre-defined for objects in the same class and/or sub-class as the object. It should be noted once again that the cuboid defines a full extent of the object and a heading of the object. The heading defines a direction in which the object's front is pointed, and therefore provides an indication as to the actual and/or possible direction of travel for the object.

Information 1120 specifying the object's predicted trajectory, the cuboid geometry(ies)/heading(s) is provided to block 1106. In some scenarios, a classification of the object is also passed to block 1106. In block 1106, a vehicle trajectory is generated using the information from blocks 1102 and 1104. Techniques for determining a vehicle trajectory using cuboids may include, for example, determining a trajectory for the AV that would pass the object when the object is in front of the AV, the cuboid has a heading direction that is aligned with the direction in which the AV is moving, and the cuboid has a length that is greater than a threshold value. The present solution is not limited to the particulars of this scenario. The vehicle trajectory 1120 can be determined based on the location information from block 1102, the object detection information from block 1104, and/or map information 1114 (which is pre-stored in a data store of the vehicle). The map information 1114 may include, but is not limited to, all or a portion of road map(s) 860 of FIG. 8. The vehicle trajectory 1120 may represent a smooth path that does not have abrupt changes that would otherwise provide passenger discomfort. For example, the vehicle trajectory is defined by a path of travel along a given lane of a road in which the object is not predicted to travel within a given amount of time. The vehicle trajectory 1120 is then provided to block 1108.

In block 1110, a steering angle and velocity command is generated based on the vehicle trajectory 1120. The steering angle and velocity command are provided to block 1110 for vehicle dynamics control, i.e., the steering angle and velocity command causes the AV to follow the vehicle trajectory 1108.

In view of the forgoing discussion, the present solution generally concerns implementing systems and methods for operating a lidar system. The method comprises: obtaining, by a processor, results produced by photodetectors of the lidar system in response to light pulses arriving at the photodetectors over time; introducing a clock drift into a clock of the lidar system, the clock drift being modeled by an analytical function; assigning, by the processor, the results to a plurality of bins based on associated times at which the light pulses arrived at the photodetectors as specified by the clock or based on distances corresponding to the associated times at which pulses arrived at the photodetectors; building, by the processor, a histogram using the results which have been assigned to the plurality of bins; performing, by the processor, fitting, curve fitting and/or interpolation operations to fit the histogram to the analytical function; identifying, by the processor, a peak of the histogram based on results of the fitting, curve fitting and/or interpolation operations; adjusting the peak based on an average time delay introduced into the clock by the analytical function; and/or causing, by the processor, operations of an autonomous vehicle to be controlled based on the peak or the adjusted peak.

In some scenarios, the analytical function comprises a first parameter defined by a time that light is emitted from the lidar system and/or a second parameter defined by an avalanche time of a photodetector. The analytical function may define a relationship between a time that light is emitted from the lidar system and an avalanche time of a photodetector. Additionally or alternatively, the analytical function is configured to cause the results from the photodetectors to be spread across multiple bins. The analytical function may include, but is not limited to, a ramp function, a sawtooth function or a sine wave function.

The implementing systems can comprise: a processor; and a non-transitory computer-readable storage medium comprising programming instructions that are configured to cause the processor to implement a method for operating a lidar system. The above-described methods can also be implemented by a computer program product comprising memory and programming instructions that are configured to cause a processor to perform operations.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

As used in this document, the singular forms "a," "an," and "the" include plural references unless the context clearly dictates otherwise. Unless defined otherwise, all technical and scientific terms used herein have the same meanings as commonly understood by one of ordinary skills in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, semi-autonomous vehicles, manually operated vehicles, teleoperated vehicles, watercraft, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

The breadth and scope of this disclosure should not be limited by any of the above-described exemplary embodiments but should be defined only in accordance with the following claims and their equivalents.

What is claimed is:

1. A method for operating a lidar system, comprising:
    obtaining, by a processor, results produced by photodetectors of the lidar system in response to light pulses arriving at the photodetectors over time;
    introducing a clock drift into a clock of the lidar system, the clock drift being modeled by an analytical function;
    assigning, by the processor, the results to bins based on associated times at which the light pulses arrived at the photodetectors as specified by the clock;
    building, by the processor, a histogram using the results which have been assigned to the bins;
    performing, by the processor, fitting operations to fit the histogram to the analytical function or a derived function of the analytical function; and
    identifying, by the processor, a peak of the histogram based on results of the fitting operations.

2. The method according to claim 1, further comprising adjusting the peak based on an average time delay introduced into the clock by the analytical function.

3. The method according to claim 1, wherein the analytical function comprises at least one of a first parameter defined by a time that light is emitted from the lidar system and a second parameter defined by an avalanche time of a photodetector.

4. The method according to claim 1, wherein the analytical function defines a relationship between a time that light is emitted from the lidar system and an avalanche time of a photodetector.

5. The method according to claim 1, wherein the analytical function is configured to cause the results from the photodetectors to be spread across multiple bins.

6. The method according to claim 1, wherein the analytical function comprises a ramp function, a sawtooth function or a sine wave function.

7. The method according to claim 1, wherein the results are assigned to the bins based on distances corresponding to the associated times at which pulses arrived at the photodetectors.

8. A system, comprising:
    a processor;
    a non-transitory computer-readable storage medium comprising programming instructions that are configured to cause the processor to implement a method for operating a lidar system, wherein the programming instructions comprise instructions to:
        obtain results produced by photodetectors of the lidar system in response to light pulses arriving at the photodetectors over time;
        introduce into a clock a clock drift modeled by an analytical function, the clock being part of a transmitter timing circuit or a receiver timing circuit;
        assign the results to bins based on associated times at which the light pulses arrived at the photodetectors as specified by the clock;
        build a histogram using the results which have been assigned to the bins;
        perform fitting operations to fit the histogram to the analytical function or a derived function of the analytical function; and
        identify a peak of the histogram based on results of the fitting operations.

9. The system according to claim 8, wherein the programming instructions further comprise instructions to adjust the peak based on an average time delay introduced into the clock by the analytical function.

10. The system according to claim 8, wherein the analytical function comprises at least one of a first parameter defined by a time that light is emitted from the lidar system and a second parameter defined by an avalanche time of a photodetector.

11. The system according to claim 8, wherein the analytical function defines a relationship between a time that light is emitted from the lidar system and an avalanche time of a photodetector.

12. The system according to claim 8, wherein the analytical function is configured to cause the results from the photodetectors to be spread across multiple bins.

13. The system according to claim 8, wherein the analytical function comprises a ramp function, a sawtooth function or a sine wave function.

14. The system according to claim 8, wherein the results are assigned to the bins based on distances corresponding to the associated times at which pulses arrived at the photodetectors.

15. A non-transitory computer-readable medium that stores instructions that is configured to, when executed by at least one computing device, cause the at least one computing device to perform operations comprising:
    obtaining results produced by photodetectors of a lidar system in response to light pulses arriving at the photodetectors over time;
    introducing, into a clock, a clock drift modeled by an analytical function;
    assigning the results to bins based on associated times at which the light pulses arrived at the photodetectors as specified by the clock;
    generating a histogram using the results which have been assigned to the bins;
    performing fitting operations to fit the histogram to the analytical function or a derived function of the analytical function; and
    identifying a peak of the histogram based on results of the fitting operations.

16. The non-transitory computer-readable medium according to claim 15, wherein the instructions further cause the at least one computing device to control operations of an autonomous vehicle based on the peak.

17. The non-transitory computer-readable medium according to claim 15, wherein the instructions further cause the at least one computing device to adjust the peak based on an average time delay introduced into the clock by the analytical function.

18. The non-transitory computer-readable medium according to claim 15, wherein the analytical function is configured to cause the results from the photodetectors to be spread across multiple bins.

19. The non-transitory computer-readable medium according to claim 15, wherein the analytical function comprises a ramp function, a sawtooth function or a sine wave function.

20. The non-transitory computer-readable medium according to claim 15, wherein the results are assigned to the bins based on distances corresponding to the associated times at which pulses arrived at the photodetectors.

* * * * *